(12) United States Patent
Ha et al.

(10) Patent No.: US 12,455,559 B2
(45) Date of Patent: Oct. 28, 2025

(54) BM AUTOMATIC CALCULATION METHOD FOR PLANT STATIONARY EQUIPMENT

(71) Applicant: SAMSUNG ENGINEERING CO., LTD., Seoul (KR)

(72) Inventors: Gyun Ho Ha, Seoul (KR); Kang Gook Park, Seoul (KR); Young Sik Ji, Seoul (KR); Geun Yong Choi, Seoul (KR); Jae Yong Lee, Seoul (KR); Eu Gene Shin, Seoul (KR); Hyun Soo Kim, Seoul (KR)

(73) Assignee: SAMSUNG ENGINEERING CO., LTD., Seoul (KR)

( * ) Notice: Subject to any disclaimer, the term of this patent is extended or adjusted under 35 U.S.C. 154(b) by 842 days.

(21) Appl. No.: 17/536,183

(22) Filed: Nov. 29, 2021

(65) Prior Publication Data

US 2023/0031017 A1 Feb. 2, 2023

(30) Foreign Application Priority Data

Jul. 30, 2021 (KR) .................. 10-2021-0100282

(51) Int. Cl.
G05B 19/418 (2006.01)

(52) U.S. Cl.
CPC ............ *G05B 19/4187* (2013.01); *G05B 2219/32423* (2013.01)

(58) Field of Classification Search
CPC ...... G05B 19/4187; G05B 2219/32423; G06Q 10/0875; Y02P 90/30
See application file for complete search history.

(56) References Cited

U.S. PATENT DOCUMENTS

| 11,556,116 B2 * | 1/2023 | Baker ............. G05B 19/4097 |
| 11,720,720 B2 * | 8/2023 | Ha ..................... G06F 30/12 703/1 |

(Continued)

FOREIGN PATENT DOCUMENTS

| JP | 2006276954 A | * 10/2006 | ........... G06Q 50/00 |
| KR | 1020030003157 A | * 1/2003 | ........... G06F 17/50 |

(Continued)

OTHER PUBLICATIONS

Subasgar, "Shell and tube heat exchanger design for sulfuric acid manufacturing plant", 2014, pp. 105, downloaded from https://www.researchgate.net/publication/286198429_Shell_and_tube_heat_exchanger_design_for_sulfuric_acid_manufacturing_plant (Year: 2014).*

(Continued)

*Primary Examiner* — Robert E Fennema
*Assistant Examiner* — Olvin Lopez Alvarez
(74) *Attorney, Agent, or Firm* — RABIN & BERDO, P.C.

(57) ABSTRACT

The present disclosure relates to a bill of material (BM) automatic calculation method for plant stationary equipment, and more particularly, to a BM automatic calculation method for plant stationary equipment capable of automatically calculating BM data for purchasing a plate required quantity required for manufacturing stationary equipment through cutting plan and optimization deployment in order to manufacture stationary equipment using data extracted from a strength calculation program of the plant stationary equipment prepared in a plant engineering step. The present disclosure has an advantage of greatly reducing the labor force by automatically calculating the cutting plan drawing, the nesting plan drawing, and required BM of the plate of the stationary machine which has been manually performed in the related art.

12 Claims, 16 Drawing Sheets

(56) References Cited

U.S. PATENT DOCUMENTS

| | | | | |
|---|---|---|---|---|
| 11,861,268 B2* | 1/2024 | Ha | ............... | G06F 3/04817 |
| 2008/0077902 A1* | 3/2008 | Harashima | ............ | G06F 30/00 |
| | | | | 716/119 |
| 2015/0066184 A1* | 3/2015 | Bradford | ......... | G05B 19/41865 |
| | | | | 700/106 |
| 2021/0271229 A1* | 9/2021 | Molcho | ............ | G05B 19/4183 |

FOREIGN PATENT DOCUMENTS

| | | | | | |
|---|---|---|---|---|---|
| KR | 100381863 B1 | * | 5/2003 | ............ | G06Q 50/04 |
| KR | 20040079573 A | * | 9/2004 | ......... | G06F 16/248 |
| KR | 1020040079573 A | | 9/2004 | | |
| KR | 1020120122392 A | | 11/2012 | | |
| KR | 20170006927 A | * | 1/2017 | ............ | Y02P 90/30 |
| KR | 1020170006927 A | | 1/2017 | | |

OTHER PUBLICATIONS

Fang et al, A comparative study of usefulness for pad reinforcement in cylindrical vessels under external load on nozzle, 2009), pp. 273-279, downloaded from https://www.sciencedirect.com/science/article/pii/S0308016108001221 (Year: 2009).*

* cited by examiner

FIG. 2

| HEAD | | | | | | | | | | | | | | | | | | |
|---|---|---|---|---|---|---|---|---|---|---|---|---|---|---|---|---|---|---|
| COMPONENT NAME | INSIDE DIAMETER | NOMINAL THK | MINIMUM THK | STRAIGHT FLANGE | CROWON RAIDUS | KNUCKLE RAIDUS | HEAD TYPE | HEAD MAT. | "L" | "R" | INSULATION THK | NORMALIZED | IMPACT TEST | INTERNAL HEAD | PIPE NPS | SCHEDULE | CLAD THK | CLAD MAT. | START ELEVATION | END ELEVATION |
| TOP HEAD | 1000 | 12 | 10.2 | 36 | | | 2:1 Ellip. | SA516-70 | | | 105 | No | No | | | | N/A | - | 272.8 | 3024.2 |
| BOTTOM HEAD | 1000 | 12 | 10.2 | 36 | | | 2:1 Ellip. | SA516-70 | | | 105 | No | No | | | | N/A | - | -296.2 | 3024.2 |

| SHELL | | | | | | | | | | | | | |
|---|---|---|---|---|---|---|---|---|---|---|---|---|---|
| COMPONENT NAME | INSIDE DIAMETER | THK | LENGTH | SHELL MAT. | INSULATION THK | NORMALIZE | IMPACT TEST | PIPE NPS | SCHEDULE | CLAD TH'K | CLAD MAT. | START ELEVATION | END ELEVATION |
| SHELL | 1000 | 10 | 2728 | SA516-70 | 105 | No | No | | - | | | 0 | 2728 |

Figure 4:
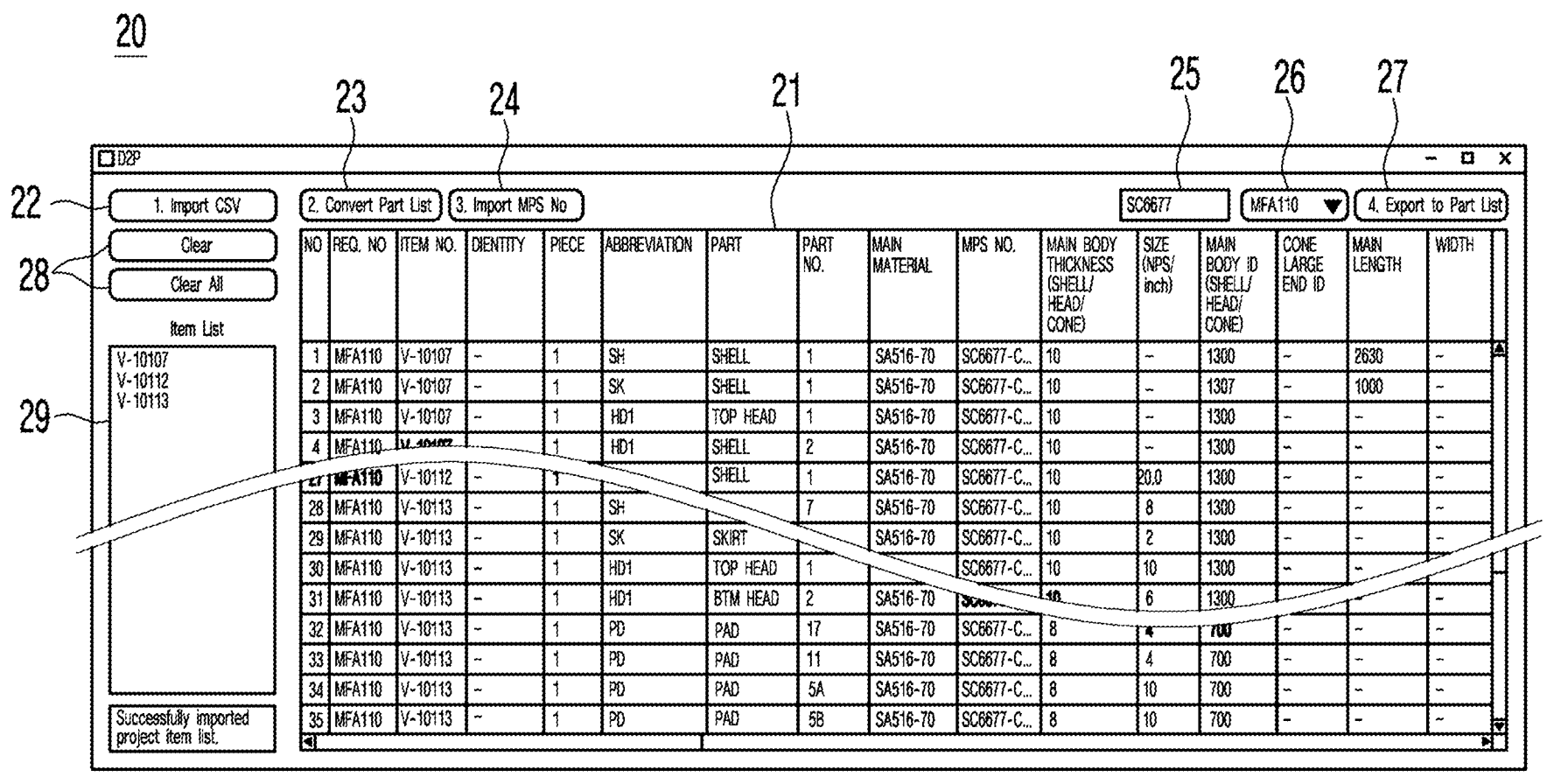

| NO | REQ. NO | ITEM NO. | IDENTITY | PIECE | ABBREVIATION | PART | PART NO. | MAIN MATERIAL | MPS NO. | MAIN BODY THICKNESS (SHELL/HEAD/CONE) | SIZE (NPS/inch) | MAIN BODY ID (SHELL/HEAD/CONE) | CONE LARGE END ID | MAIN LENGTH | WIDTH |
|---|---|---|---|---|---|---|---|---|---|---|---|---|---|---|---|
| 1 | MFA110 | V-10107 | - | 1 | SH | SHELL | 1 | SA516-70 | SC6677-C... | 10 | - | 1300 | - | 2630 | - |
| 2 | MFA110 | V-10107 | - | 1 | SK | SHELL | 1 | SA516-70 | SC6677-C... | 10 | - | 1307 | - | 1000 | - |
| 3 | MFA110 | V-10107 | - | 1 | HD1 | TOP HEAD | 1 | SA516-70 | SC6677-C... | 10 | - | 1300 | - | - | - |
| 4 | MFA110 | V-10107 | - | 1 | HD1 | SHELL | 2 | SA516-70 | SC6677-C... | 10 | 20.0 | 1300 | - | - | - |
| 28 | MFA110 | V-10112 | - | 1 | SH | SHELL | 7 | SA516-70 | SC6677-C... | 10 | 8 | 1300 | - | - | - |
| 29 | MFA110 | V-10113 | - | 1 | SK | SKIRT | 1 | SA516-70 | SC6677-C... | 10 | 2 | 1300 | - | - | - |
| 30 | MFA110 | V-10113 | - | 1 | HD1 | TOP HEAD | 2 | SA516-70 | SC6677-C... | 10 | 6 | 1300 | - | - | - |
| 31 | MFA110 | V-10113 | - | 1 | HD1 | BTM HEAD | 17 | SA516-70 | SC6677-C... | 8 | 4 | 700 | - | - | - |
| 32 | MFA110 | V-10113 | - | 1 | PD | PAD | 11 | SA516-70 | SC6677-C... | 8 | 4 | 700 | - | - | - |
| 33 | MFA110 | V-10113 | - | 1 | PD | PAD | 5A | SA516-70 | SC6677-C... | 8 | 10 | 700 | - | - | - |
| 34 | MFA110 | V-10113 | - | 1 | PD | PAD | 5B | SA516-70 | SC6677-C... | 8 | 10 | 700 | - | - | - |
| 35 | MFA110 | V-10113 | - | 1 | PD | PAD |  | SA516-70 | SC6677-C... | 8 | 10 | 700 | - | - | - |

Buttons: 1. Import CSV, 2. Convert Part List, 3. Import MPS No, 4. Export to Part List, Clear, Clear All Item List:
V-10107
V-10112
V-10113

Successfully imported project item list.

FIG. 11
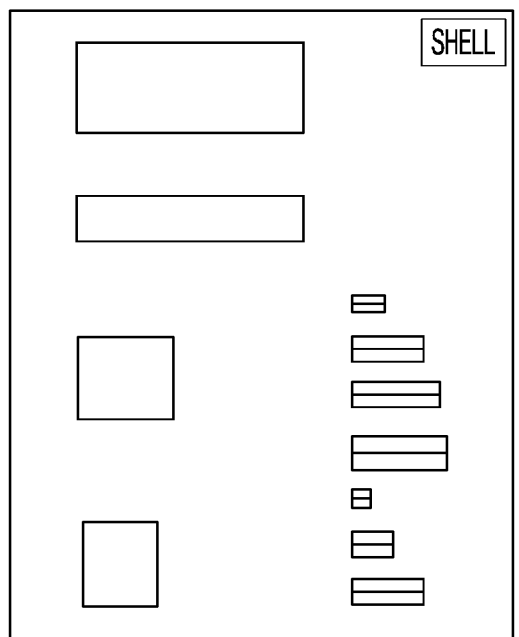
(a) 5411a
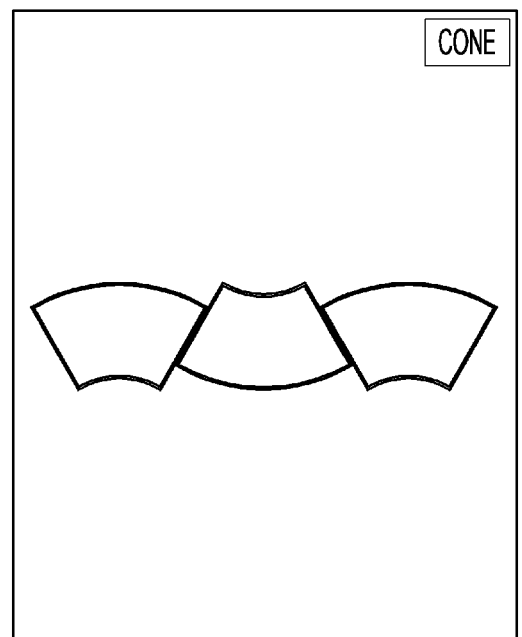
(b) 5411b
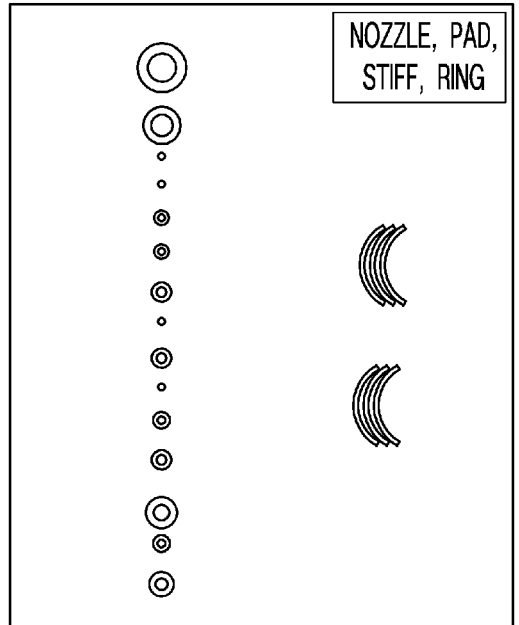
(c) 5411c
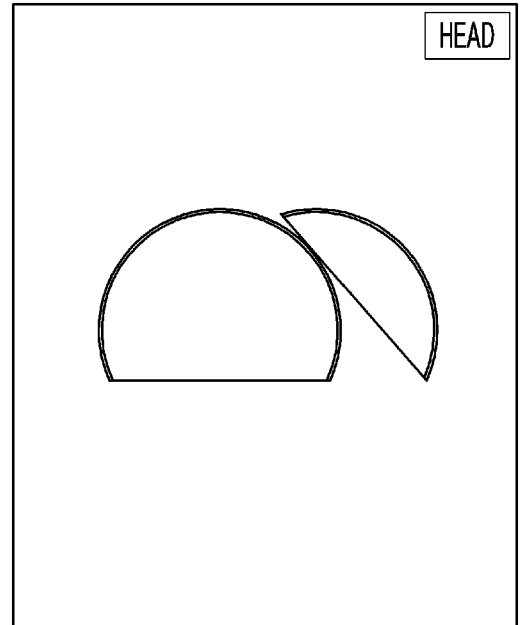
(d) 5411c

FIG. 13

| PJT NO. | SC6677 | | PLATE CUTTING PLAN | | SHEET | 1 of 1 |
|---|---|---|---|---|---|---|
| BM NO. | SC6677-MFA110-BM-020 | | MATERIAL | SIZE | Q'TY(EA) | WEIGHT(kg) |
| MPS NO. | SC6677-SS304L-01 | | SA240-304L- | t15 x 3040 x 9950 | 1 | 3,629.8 |

USAGE : 83.8 %

(*) SEGMENT PER Q'TY

| NO. | REQ NO. | ITEM NO. | DESCRIPTION | ORGINAL SIZE (t x W x L or ø) | ACTUAL SIZE (t x W x L or ø) | Q'TY | SEG. (*) | REV. | REMARK (Q'TY/TOTAL) |
|---|---|---|---|---|---|---|---|---|---|
| 82 | MFA110 | V-10212 | SH-3 | t15 x ø1800 x W3000 | t15 x 3000 x 5702 | 1 | 1 | 0 | 1/1 |
| 85 | MFA110 | V-10212 | HD1-2 (CROWN) | t15 x ø1800 | t15 x ø2290 | 1 | 1 | 0 | 1/1 |
| 86 | MFA110 | V-10212 | NE-11 | t15 x 20" x 307L | t15 x 307 x 1551 | 1 | 1 | 0 | 1/1 |
| 87 | MFA110 | V-10212 | NE-1 | t15 x 20" x 307L | t15 x 307 x 1551 | 1 | 1 | 0 | 1/1 |
| 90 | MFA110 | V-10212 | PD-17 | t15 x 10" x ø509.95 | t15 x 512 x 521 | 1 | 1 | 0 | 1/1 |
| 91 | MFA110 | V-10212 | PD-31 | t15 x 3" x ø180 | t15 x 181 x 181 | 1 | 1 | 0 | 1/1 |
| 92 | MFA110 | V-10212 | PD-11 | t15 x 20" x ø970 | t15 x 973 x 977 | 1 | 1 | 0 | 1/1 |
| 94 | MFA110 | V-10212 | PD-1 | t15 x 20" x ø970 | t15 x 973 x 977 | 1 | 1 | 0 | 1/1 |

LIST OF ABBREVIATIONS
CL : CLIP          HD1 : 2:1 ELIP. HEAD    FH : FLOATING HEAD     SH : SHELL              PP : PASS PARTITION
CP : CLIP PAD      HD2 : 10% DISHED HEAD   BF : BAFFLE            SK : SKIRT              WP : WEAR PLATE
CN : CONE          HD3 : 6% DISHED HEAD    LB : LONGITUDINAL BAFFLE  SR : INTERNAL SUPPORT RING  MB : MITER BEND
EN : ECC. CONE     HD4 : FLAT HEAD         NE : NOZZLE NECK       SS : SADDLE STIFFENER RING
EJ : EXPANSION JOINT  HD5 : HEMI. HEAD     PD : NOZZLE PAD        ST : STIFFENER RING

SAMSUNG ENGINEERING

CUTTING PLAN PART LIST — 5432

| BM NO. | NO | REQ. NO | ITEM NO | DESCRIPTION | ORIGINAL SIZE (t x W x L or ∅) | ACTUAL SIZE (t x W x L or ∅) | QTY | SEG. | REV. | REMARKS |
|---|---|---|---|---|---|---|---|---|---|---|
| SC6677-MFA110-BM-001 | 195 | MFA110 | V-10602 | SK-1 | 16 x ∅1618 x W1200 | t6 x ∅1200 x 5192 | 1 | 1 | 0 | 1/1 |
| SC6677-MFA110-BM-001 | 179 | MFA110 | V-10601 | SK-1 | 16 x ∅1719 x W1230 | t6 x 1200 x 5420 | 1 | 1 | 0 | 1/1 |
| SC6677-MFA110-BM-002 | 211 | MFA110 | V-10603 | SK-1 | t9 x ∅2023 x W1500 | t9 x 1500 x 6331 | 1 | 1 | 0 | 1/1 |
| SC6677-MFA110-BM-003 | 239 | MFA110 | V-10604 | WP-1&2 | t10 x ∅1332 x W274 x 132 | t10 x 274 x 1546 | 2 | 1 | 0 | 2/2 |
| SC6677-MFA110-BM-004 | 332 | MFA110 | V-19603 | NE-W | t7 x 74" x 344L | t12 x 544 x 1880 | 1 | 1 | 0 | 1/1 |
| SC6677-MFA110-BM-004 | 207 | MFA110 | V-10602 | PD-35 | t12 x 2" x ∅150.02 | t12 x 151 x 151 | 1 | 1 | 0 | 1/1 |
| SC6677-MFA110-BM-004 | 206 | MFA110 | V-10602 | PD-1 | t12 x 20" x ∅970 | t12 x 973 x 977 | 1 | 1 | 0 | 1/1 |
| SC6677-MFA110-BM-004 | 205 | MFA110 | V-10602 | PD-12 | t12 x 4" x ∅210 | t12 x 211 x 211 | 1 | 1 | 0 | 1/1 |
| SC6677-MFA110-BM-004 | 204 | MFA110 | V-10602 | PD-13 | t12 x 4" x ∅210 | t12 x 211 x 211 | 1 | 1 | 0 | 1/1 |
| SC6677-MFA110-BM-004 | 203 | MFA110 | V-10602 | PD-11 | t12 x 12" x ∅609.95 | t12 x 612 x 614 | 1 | 1 | 0 | 1/1 |
| SC6677-MFA110-BM-004 | 202 | MFA110 | V-10602 | PD-17 | t12 x 6" x ∅299.98 | t12 x 301 x 305 | 1 | 1 | 0 | 1/1 |
| SC6677-MFA110-BM-004 | 201 | MFA110 | V-10602 | PD-31 | t12 x 2" x ∅150.02 | t12 x 151 x 151 | 1 | 1 | 0 | 1/1 |
| SC6677-MFA110-BM-004 | 200 | MFA110 | V-10602 | PD-7 | t12 x 14" x ∅630 | t12 x 662 x 664 | 1 | 1 | 0 | 1/1 |
| SC6677-MFA110-BM-004 | 199 | MFA110 | V-10602 | NE-7 | t12 x 14" x 341L | t12 x 341 x 1092 | 1 | 1 | 0 | 1/1 |
| SC6677-MFA110-BM-004 | 194 | MFA110 | V-10602 | SH-2 | t12 x ∅1600 x W2300 | t12 x 2300 x 5065 | 1 | 1 | 0 | 1/1 |
| SC6677-MFA110-BM-004 | 193 | MFA110 | V-10602 | SH-1 | t12 x ∅1650 x W1526 | t12 x 1526 x 5065 | 1 | 1 | 0 | 1/1 |
| SC6677-MFA110-BM-005 | 329 | MFA110 | V-19603 | HD1-1 (CROWN) | t12 x ∅2200 | t12 x ∅2780 | 1 | 1 | 0 | 1/1 |
| SC6677-MFA110-BM-005 | 197 | MFA110 | V-10602 | HD1-2 (CROWN) | t12 x ∅1600 | t12 x ∅2030 | 1 | 1 | 0 | 1/1 |
| SC6677-MFA110-BM-005 | 196 | MFA110 | V-10602 | HD1-1 (CROWN) | t12 x ∅1650 | t12 x ∅2030 | 1 | 1 | 0 | 1/1 |
| SC6677-MFA110-BM-006 | 227 | MFA110 | V-10603 | PD-35 | t13 x 2" x ∅150.02 | t13 x 151 x 151 | 1 | 1 | 0 | 1/1 |
| SC6677-MFA110-BM-006 | 224 | MFA110 | V-10605 | PD-12 | t13 x 3" x ∅180 | t13 x 181 x 181 | 1 | 1 | 0 | 1/1 |
| SC6677-MFA110-BM-006 | 192 | MFA110 | V-10601 | PD-50 | t13 x 3" x ∅180 | t13 x 181 x 181 | 1 | 1 | 0 | 1/1 |
| SC6677-MFA110-BM-006 | 191 | MFA110 | V-10601 | PD-35 | t13 x 2" x ∅150.02 | t13 x 151 x 151 | 1 | 1 | 0 | 1/1 |
| SC6677-MFA110-BM-006 | 190 | MFA110 | V-10601 | PD-1 | t13 x 6" x ∅299.98 | t13 x 973 x 977 | 1 | 1 | 0 | 1/1 |
| SC6677-MFA110-BM-006 | 189 | MFA110 | V-10601 | PD-11 | t13 x 6" x ∅299.95 | t13 x 301 x 302 | 1 | 1 | 0 | 1/1 |
| SC6677-MFA110-BM-006 | 188 | MFA110 | V-10601 | PD-15 | t13 x 10" x ∅509.95 | t13 x 512 x 513 | 1 | 1 | 0 | 1/1 |
| SC6677-MFA110-BM-006 | 187 | MFA110 | V-10601 | PD-13 | t15 x 5" x ∅299.98 | t15 x 301 x 302 | 1 | 1 | 0 | 1/1 |
| SC6677-MFA110-BM-006 | 186 | MFA110 | V-10601 | PD-14 | t13 x 6" x ∅299.98 | t13 x 301 x 304 | 1 | 1 | 0 | 1/1 |
| SC6677-MFA110-BM-006 | 185 | MFA110 | V-10601 | PD-31 | t13 x 2" x ∅150.02 | t13 x 151 x 151 | 1 | 1 | 0 | 1/1 |
| SC6677-MFA110-BM-006 | 184 | MFA110 | V-10601 | PD-7 | t13 x 16" x ∅780 | t13 x 782 x 785 | 1 | 1 | 0 | 1/1 |
| SC6677-MFA110-BM-006 | 183 | MFA110 | V-10601 | NE-1 | t13 x 20" x 809L | t13 x 309 x 1558 | 1 | 1 | 0 | 1/1 |
| SC6677-MFA110-BM-006 | 182 | MFA110 | V-10601 | NE-7 | t13 x 16" x 679L | t13 x 679 x 1258 | 1 | 1 | 0 | 1/1 |

BM AUTOMATIC CALCULATION METHOD FOR PLANT STATIONARY EQUIPMENT

CROSS-REFERENCE TO RELATED APPLICATIONS

This application claims the priority of Korean Patent Application No. 10-2021-0100282 filed on Jul. 30, 2021, in the Korean Intellectual Property Office, the disclosure of which is incorporated herein by reference.

BACKGROUND OF THE INVENTION

Field of the Invention

The present disclosure relates to a bill of material (BM) automatic calculation method for plant stationary equipment, and more particularly, to a BM automatic calculation method for plant stationary equipment capable of automatically calculating BM data for purchasing a plate required quantity required for manufacturing stationary equipment through cutting plan and optimization deployment in order to manufacture stationary equipment using data extracted from a strength calculation program of the plant stationary equipment prepared in a plant engineering step.

Description of the Related Art

A plant is a collection of large-scale facilities built on land or sea, and typically, is completed through an engineering step divided into a basic design, a front end engineering design (FEED), and a detailed design, and purchasing, constructing, and test-driving steps, and then commercially driven. In an engineering, procurement, and construction (EPC) step of a general plant, a process in which various data and references are generated, modified, and fixed is performed, and in a process of handing-over a factory to an orderer at the time of completion, a hand-over operation of transferring AS-BUILT (completion) data is also included and finally, a site acceptance test (SAT) process is performed to finish a project.

In the engineering step of the plant, in order to satisfy design conditions and design requirements given in all fields (piping, machinery, electrics, control, construction, steel frame, and civil engineering) for construction of large-scale plants, in an initial planning step, drawings are prepared with 2D CAD. Two-dimensional planning drawings are prepared depending on process conditions reflecting the requirements and process requirements of an orderer in the future, and when the preparation of the planning drawing is finished, a 3D modeling (modeling) operation is performed on the basis of the planning drawing. In the case of 3D modeling, the stationary equipment and piping are connected, but the strength analysis and detail engineering for the stationary equipment are performed separately. Generally, the stationary equipment includes a pressure vessel, a column or tower, a tank, a heat exchanger, a reactor, and the like. In the related art, the detailed engineering, including the strength calculation of the stationary equipment has been directly manufactured and provided by an equipment vendor, and an engineering company checks a data sheet supplied by the equipment vendor, examines whether the strength calculation of each stationary machine required on a process is correctly performed, and the like, and then sends data for a check list to the equipment vendor again, and the equipment vendor has manufactured the stationary machines according to modified matters.

Accordingly, a BM calculation operation on the plate quantity for preparing the data sheet for the stationary machine and fabricating the stationary machine has been performed in the equipment vendor. The BM (bill of material) calculation means summing quantities for the material purchasing. As a result, the engineering company determines an appropriate equipment vendor according to estimated costs presented by a plurality of equipment vendors, and the determined equipment vendor fabricates the stationary equipment and provides the stationary equipment to a plant field.

Since the BM calculation operation for the stationary equipment in the related art has been conducted manually in the equipment vendor, it is difficult to consider the accuracy of the calculated quantity. In addition, since the BM calculation and the accurate cutting plan are not presented, there were a lot of scraps that have been discarded during the fabrication of the stationary machine, and as a result, there was a problem that it is difficult to get the cost reduction effect for the fabrication of the stationary machine.

The above-described technical configuration is the background art for helping in the understanding of the present disclosure, and does not mean a conventional technology widely known in the art to which the present disclosure pertains.

SUMMARY OF THE INVENTION

An object of the present disclosure is to provide a BM automatic calculation method of plant stationary equipment capable of cutting plane drawings preparation and BM automatic calculation using data provided from a strength calculation program for stationary machines performed in an engineering step of a plant.

In order to achieve the objects, the present disclosure provides a BM automatic calculation method for plant stationary equipment that includes (a) performing strength calculation for each item of a stationary machine having each unique number based on process data required in a plant using a strength calculation program and extracting input data in a first format from a strength calculation result for each item in which the strength calculation is performed, (b) extracting all object data for each item for preparing drawings from the extracted input data in the first format and converting all of the extracted object data into a second format, (c) extracting only information on apart where an item-specific plate is used from all of the object data for each item converted into the second format and generating total part list data interlocking with an MPS number sheet in information data for the extracted part where the item-specific plate is used, (d) loading the total part list data as input data in a BM calculation program, (e) setting the standard of a purchasing plate built with a library within the BM calculation program, (f) setting cutting and fabrication margins for each part for preparing cutting plan drawings built with the library within the BM calculation program, and (g) calculating BM related data by executing the BM calculation program.

In step (a), the first format may be formatted in an XML file form.

In step (b), the second format may be formatted in a data sheet file form.

In step (b), all of the object data for each item of the stationary machine may include nozzle data, design data, material specification data, and detail drawing data.

In step (c), the part where the item-specific plate is used may include a shell, a head, a cone, a nozzle neck, a reinforced pad, a wear plate, and a stiffener ring, which are parts included in the item-specific object data converted into the second format.

Information about the parts of the shell, the head, the cone, the nozzle neck, the reinforced pad, the wear plate and the stiffener ring may be name information of each part, type information of each part, size information of each part, and material information of each part.

The material purchaser specification (MPS) number sheet of step (c) may be mutually mapped based on an item number of the stationary machine and interlock with the information data for the part where the plate is used.

Items to be added to the total part list by the interlocking of the MPS number sheet may be a project number, a requisition number, and an MPS number.

In total part list of step (c) may include data for size information, material information, shape information, MPS number information, and dimension information on the item-specific plate application part.

The setting of the standard of the purchasing plate in step (e) may be to set minimum and maximum sizes of a width and a length of a purchasable plate as defaults in the library and set the standard of the purchasing plate within the set default range.

The setting of the cutting and fabrication margins for each part in step (f) may be to set the cutting and fabrication margins in consideration of a consumed amount during cutting and a consumed amount during fabrication.

Step (g) may include (g-1) preparing a cutting plan drawing according to the set cutting and fabrication margins for each part, (g-2) preparing a nesting plan drawing optimized by disposing the cutting plan drawing in the standard of the set purchasing plate, and (g-3) generating BOM list and cutting plan part list data based on the nesting plan drawing.

In step (g-2), a part-specific cutting plan drawing having the same MPS number, the same thickness, and the same material may be disposed in the optimized nesting plan drawing.

The BM calculation program in steps (d) to (g) may be executed on an AUTOCAD as a universal drawing preparation program.

The BM related data may include a cutting plan drawing, a nesting plan drawing where the cutting plan drawing is optimized and disposed, BOM list data, and cutting plan part list data.

According to the BM automatic calculation method of plant stationary equipment of the present disclosure, since the BM of the stationary machine which has been manually performed in the related art may be automatically calculated, there is an advantage of greatly reducing the labor force.

According to the BM automatic calculation method of plant stationary equipment of the present disclosure, since the disposition of the cutting plan is optimized to minimize the quantity of plates discarded by scrap, there is an advantage of greatly reducing the costs.

According to the BM automatic calculation method of plant stationary equipment of the present disclosure, since the BM is prepared based on the optimized cutting plan, there is an advantage of optimizing material purchasing quantity and type.

According to the BM automatic calculation method of plant stationary equipment of the present disclosure, since the BM calculation which has been manually performed may be automatically calculated, there is an advantage of shortening a plant entire construction period by shortening a design period and a fabrication period.

According to the BM automatic calculation method of plant stationary equipment of the present disclosure, since the method may be implemented on AUTOCAD as a universal program, there is an advantage of having excellent usage adaptability capable of being easily used by a plurality of users.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 2 and 3 are exemplary diagrams for a second format form in the BM automatic calculation method for plant stationary equipment according to the present disclosure;

FIG. 4 is a diagram for a program screen for generating a total part list in the BM automatic calculation method for plant stationary equipment according to the present disclosure;

Figure 5:
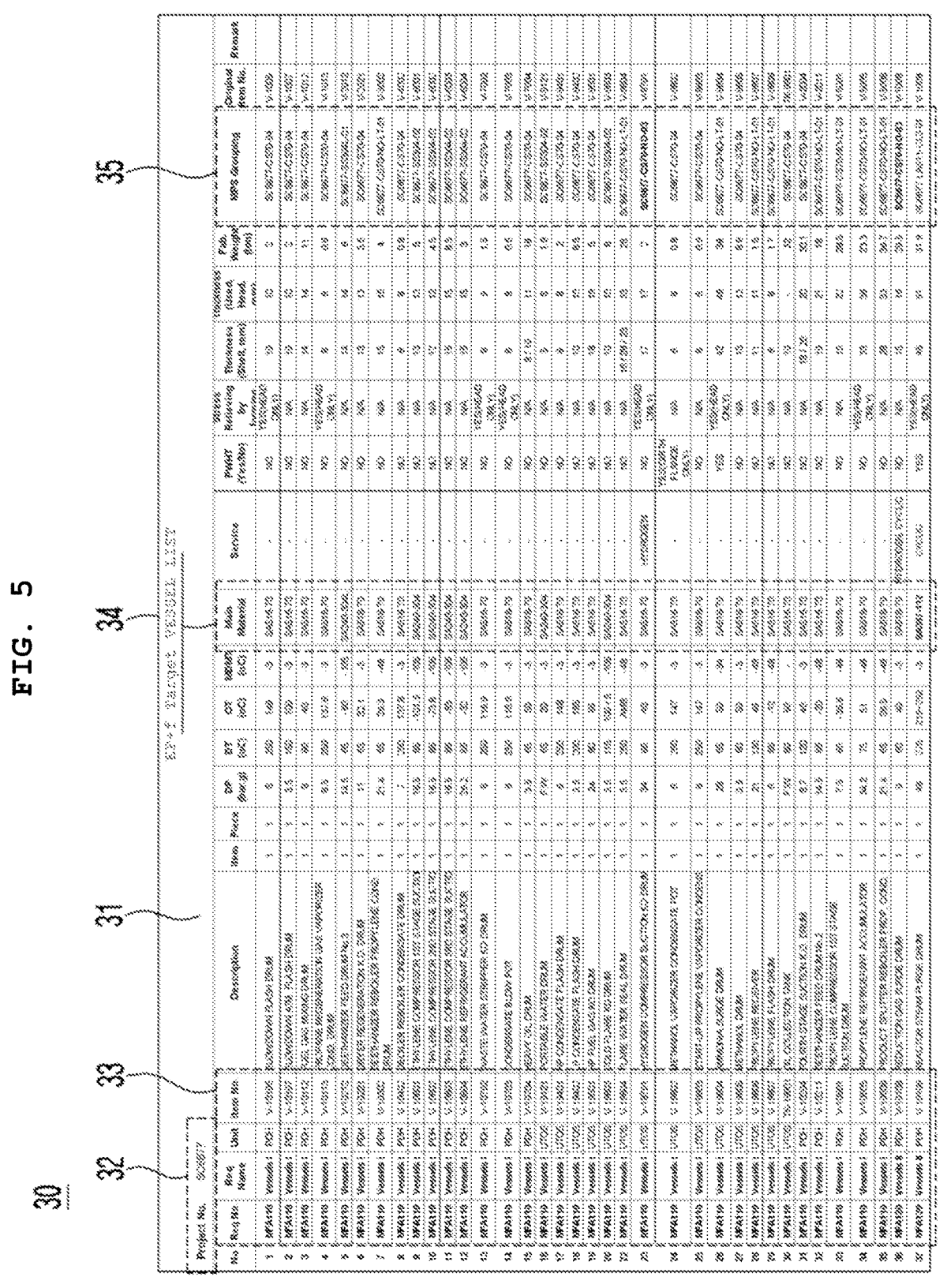

FIG. 5 is an exemplary diagram of an MPS number sheet interlocking with a program for the total part list in the BM automatic calculation method for plant stationary equipment according to the present disclosure;

Figure 6:
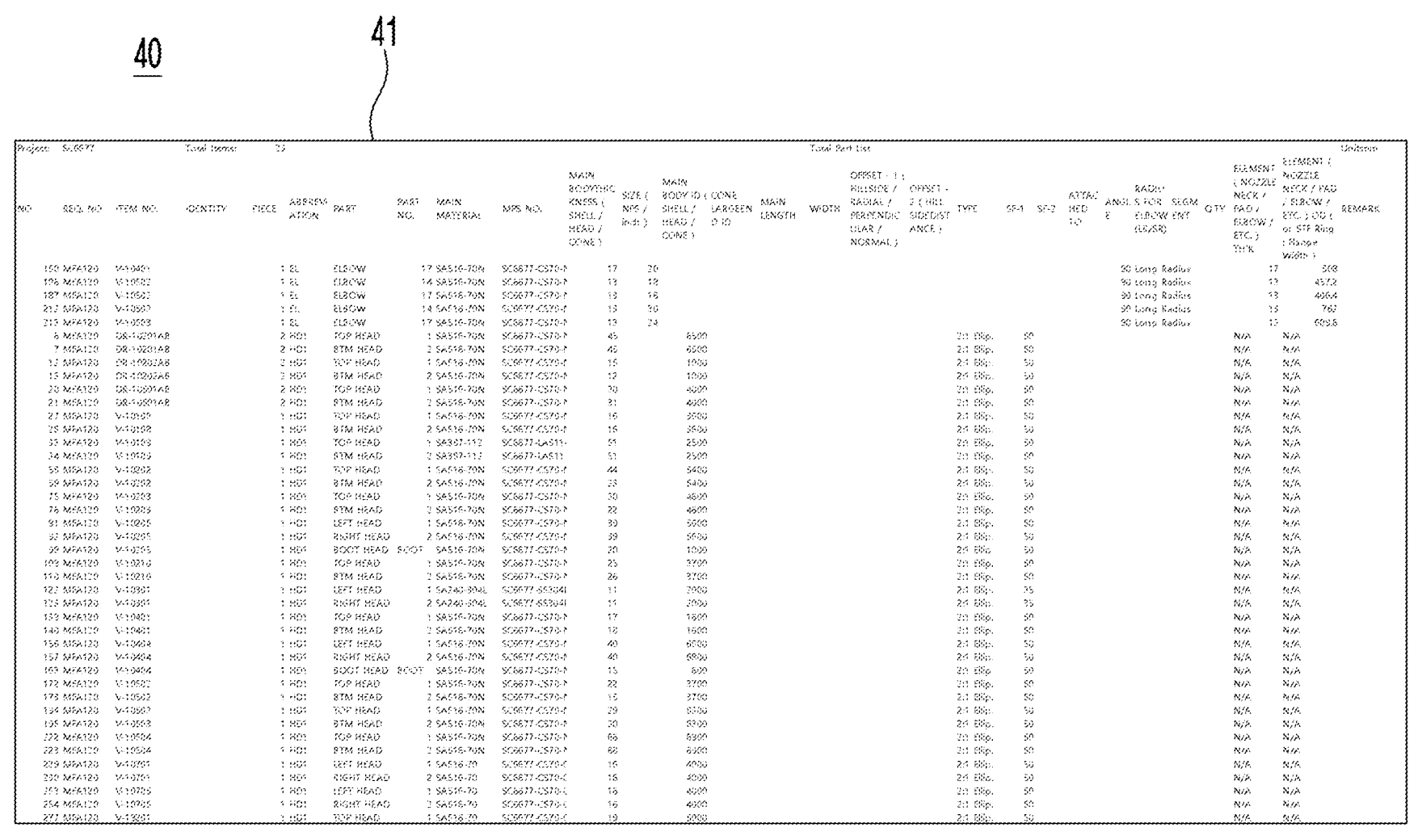

FIG. 6 is an exemplary diagram of the total part list expressed by execution of the program of FIG. 5;

Figure 10:
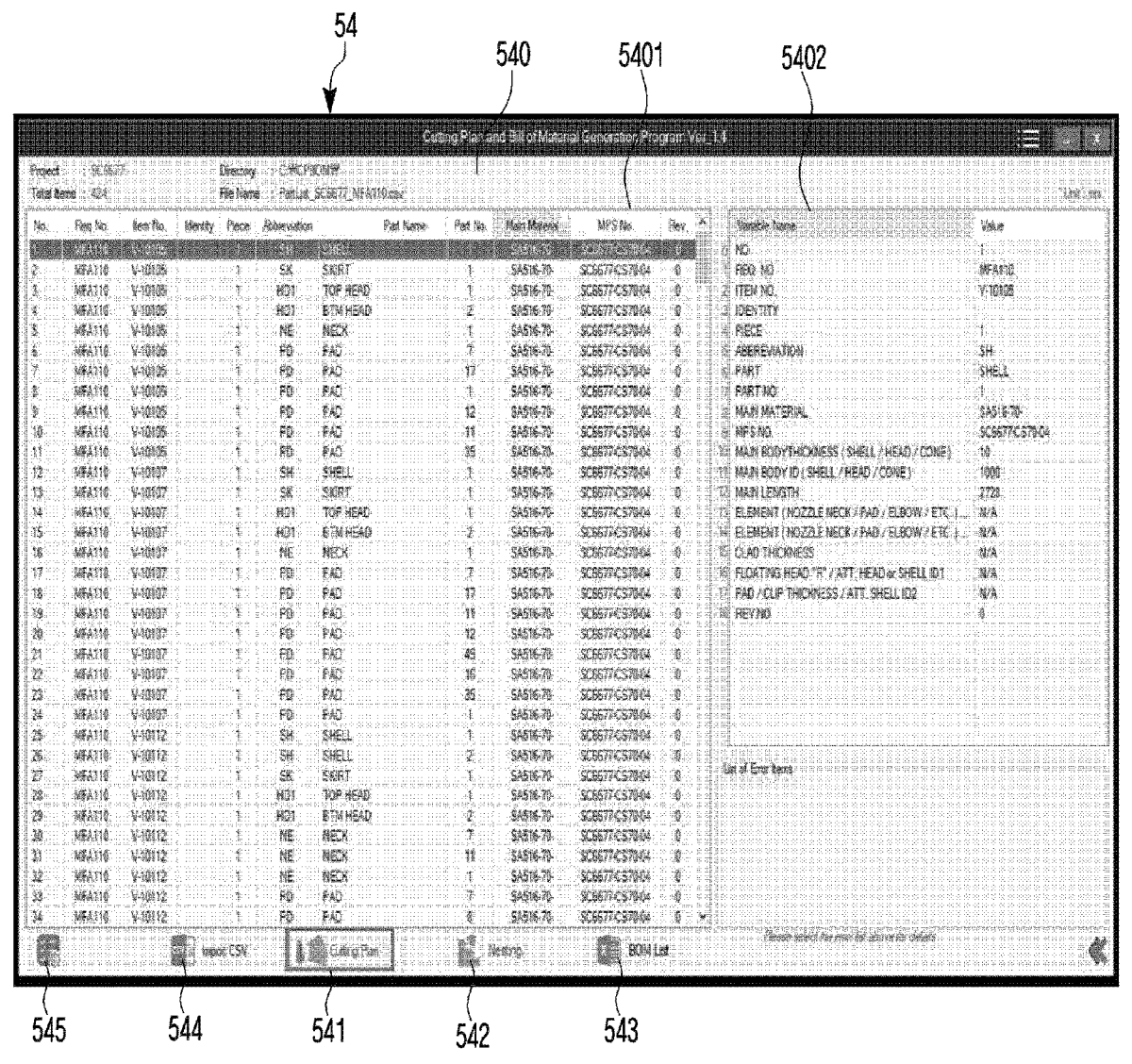

FIG. 10 is a program screen for a step of preparing a cutting plan drawing in the BM calculation program of FIG. 7;

FIG. 11 is an exemplary diagram of the cutting plan drawing prepared through the BM calculation program of FIG. 10;

FIG. 13 is an exemplary diagram of the nesting plan drawing prepared through the BM calculation program of FIG. 12;

Figure 14:
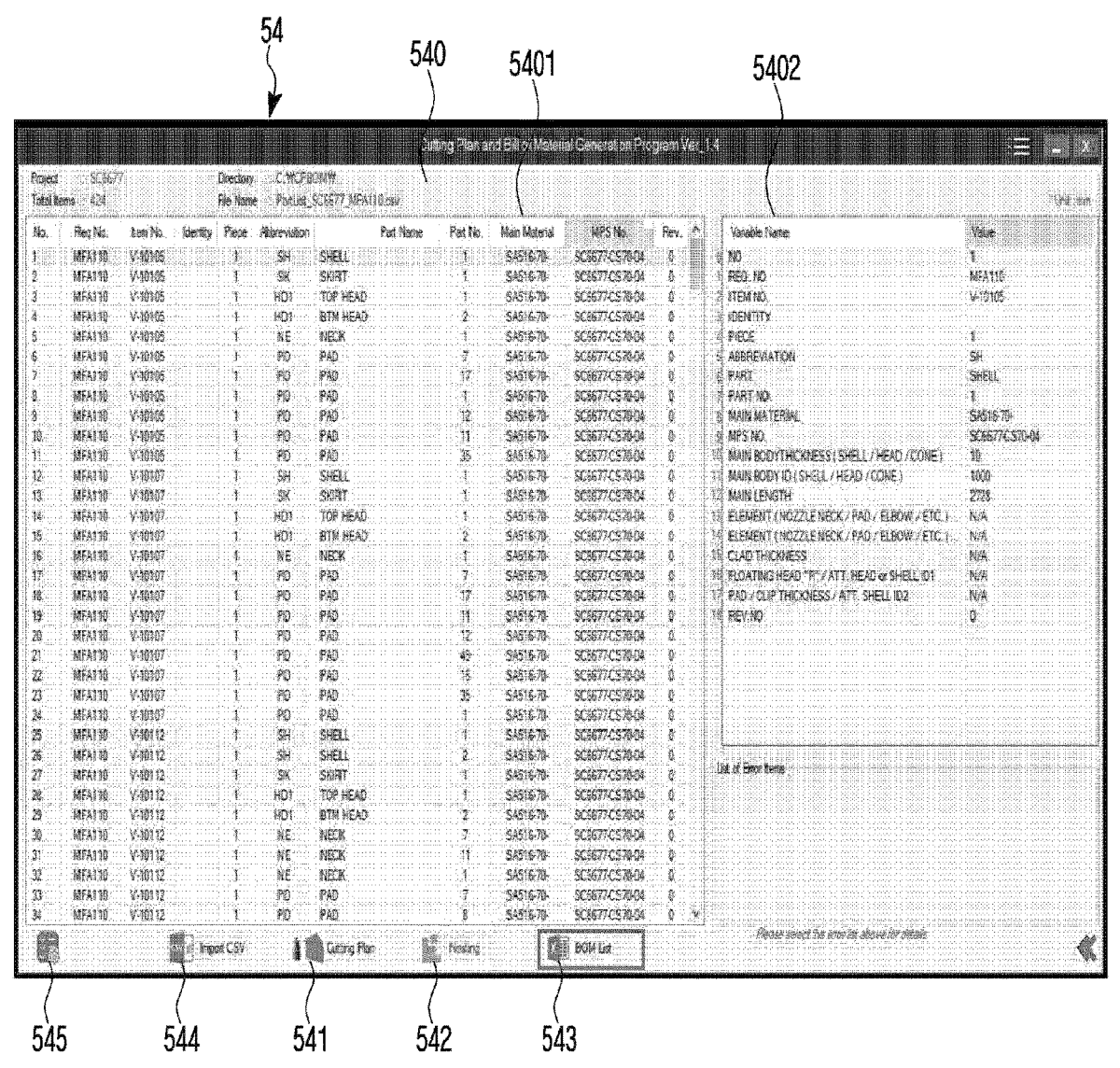

FIG. 14 is a program screen for a step of generating BM-related data in the BM calculation program of FIG. 7;

Figure 15:
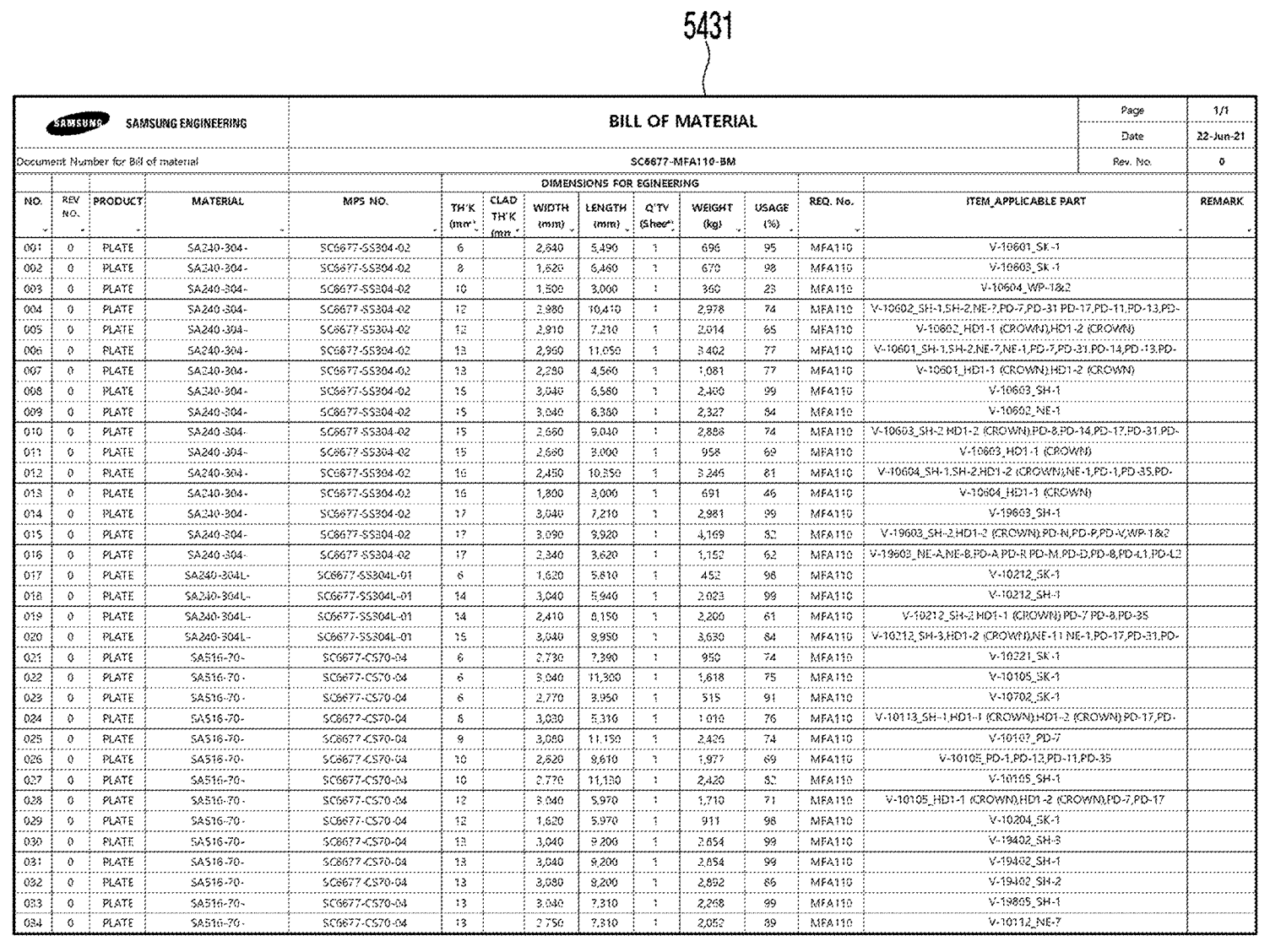

FIG. 15 is an exemplary diagram of a BOM data sheet generated by FIG. 14; and

FIG. 16 is an exemplary diagram of a cutting plan part list data sheet generated by FIG. 14.

DETAILED DESCRIPTION OF THE PREFERRED EMBODIMENT

Figure 1:
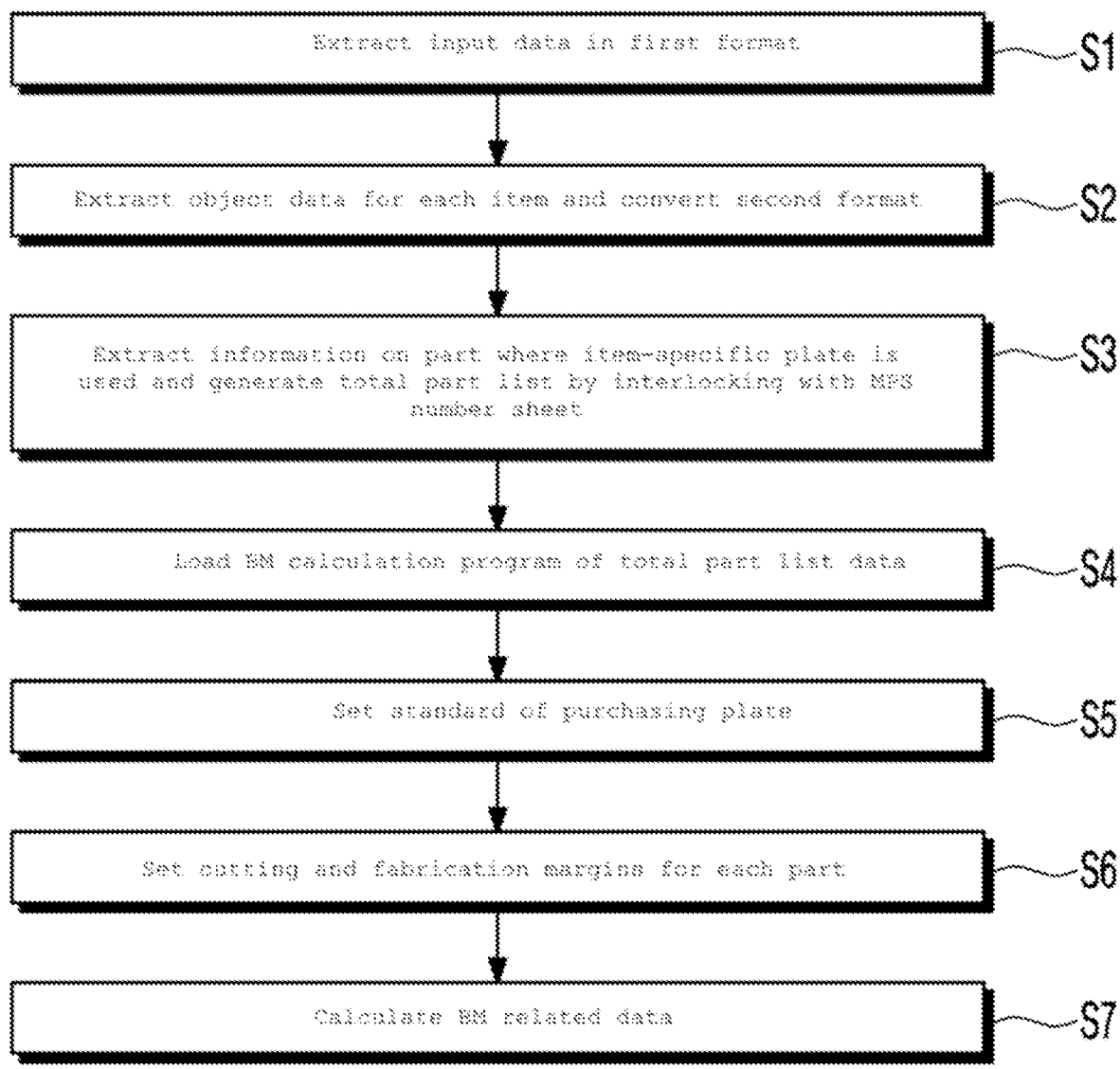
FIG. 1 is a flowchart of a BM automatic calculation method for plant stationary equipment according to the present disclosure.

Hereinafter, exemplary embodiments of the present disclosure in which the above objects can be specifically realized will be described in detail with reference to the accompanying drawings. In describing the embodiment, the same name and the same reference numeral are used with respect to the same component and the resulting additional description will be omitted.

Figure 7:
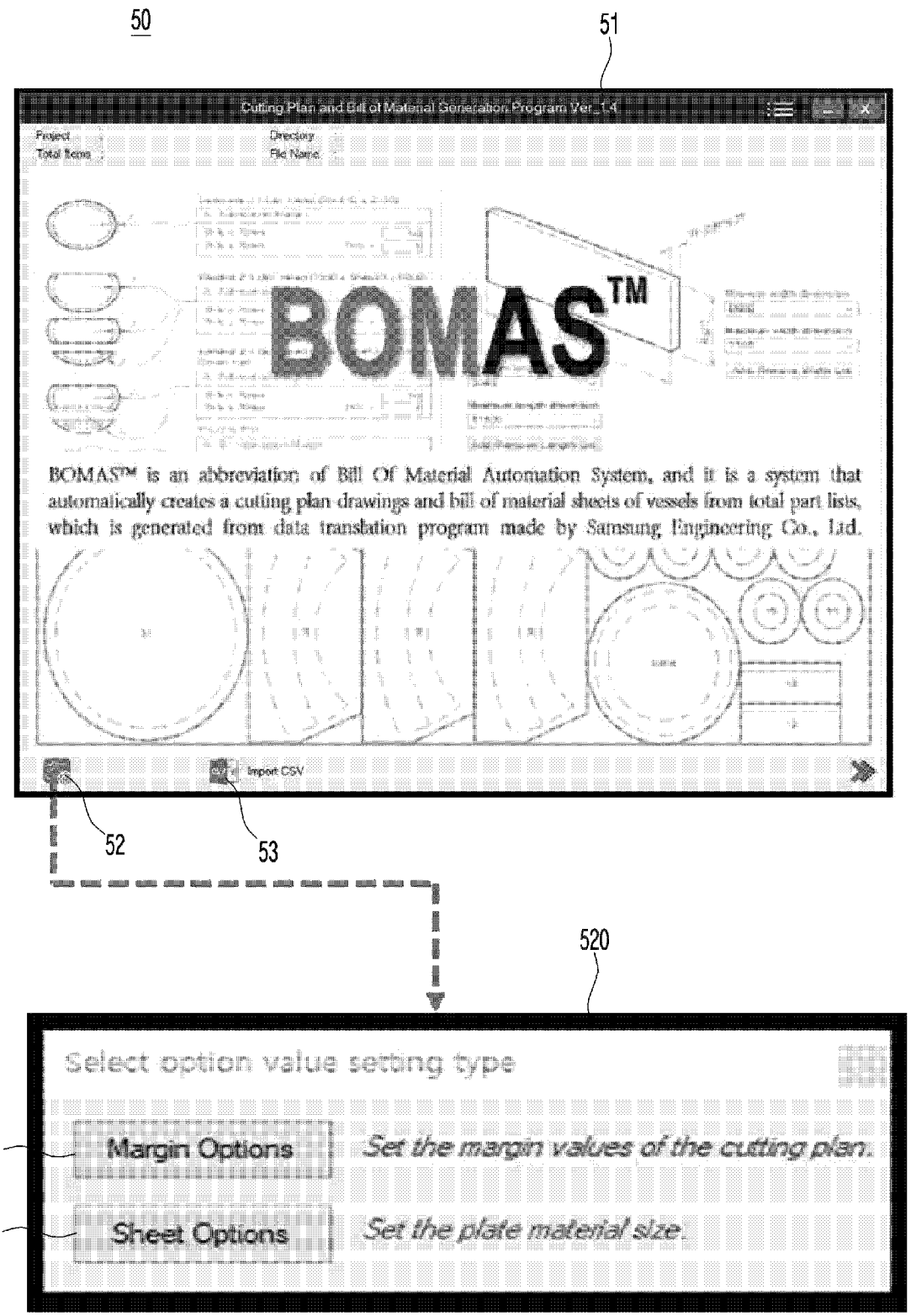
FIG. 7 is an exemplary diagram for a start screen of a BM calculation program in the BM automatic calculation method for plant stationary equipment according to the present disclosure.
Figure 8:
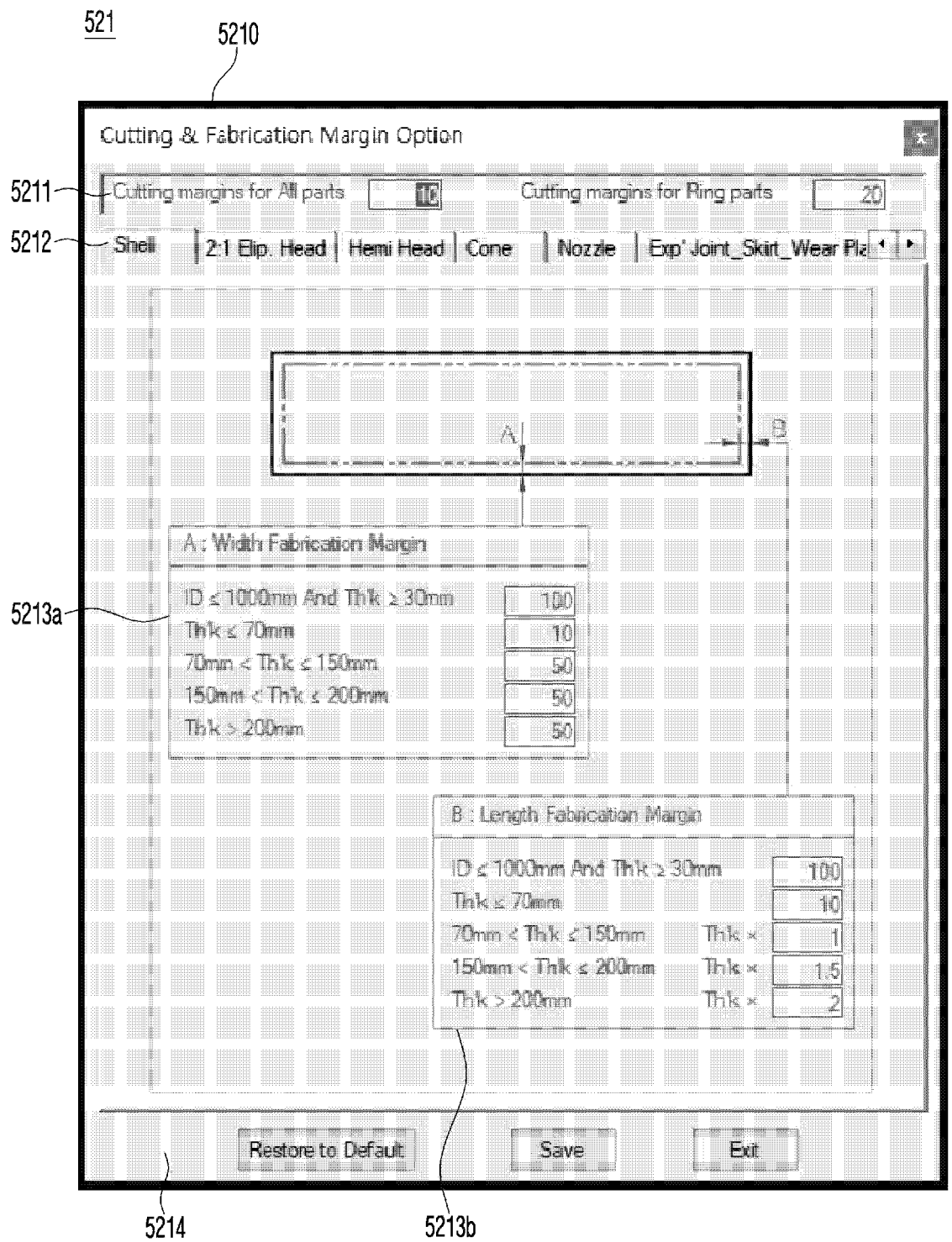
FIG. 8 is an exemplary diagram for a screen for setting cutting and fabrication margins for each part in the BM calculation program of FIG. 7.
Figure 9:
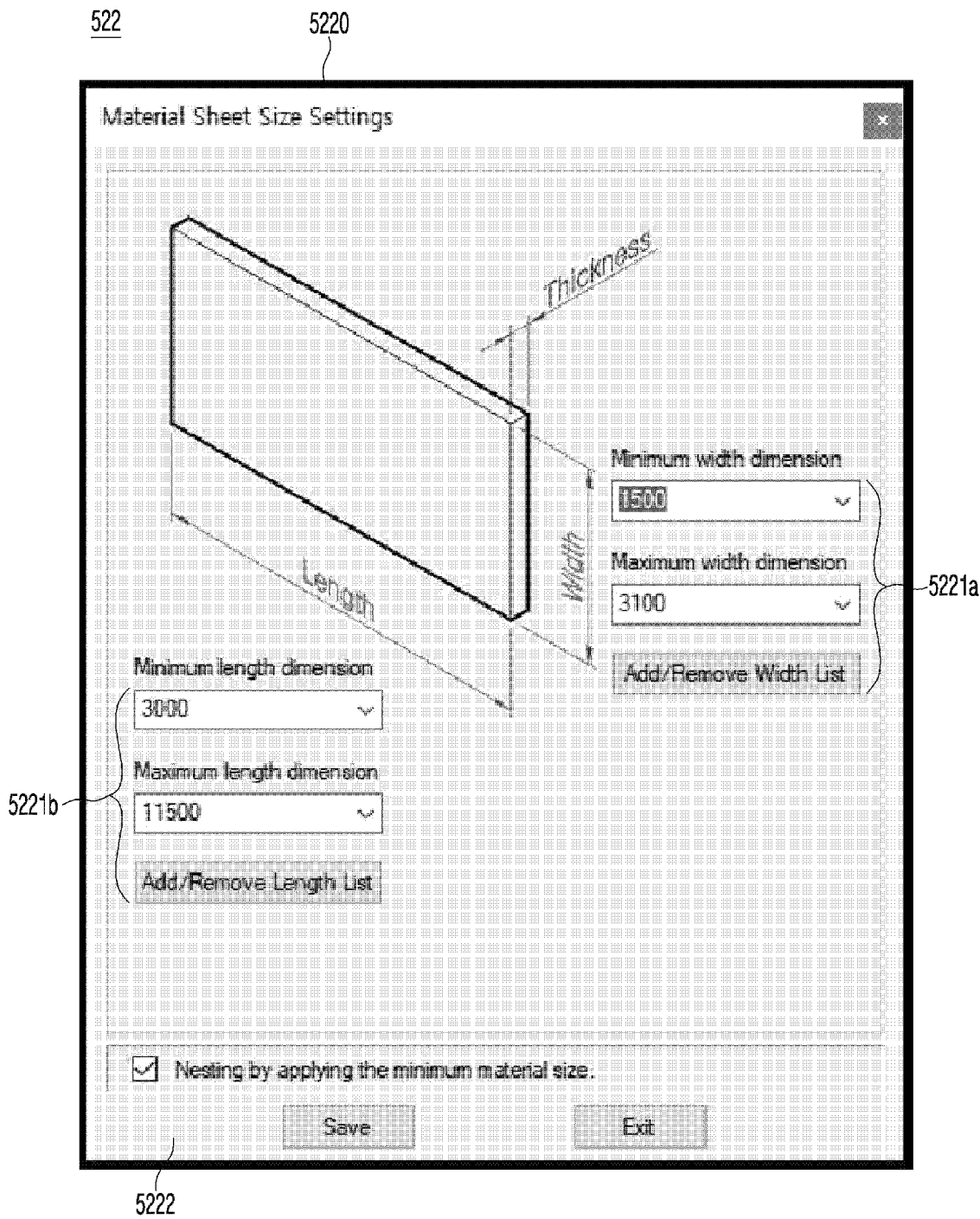
FIG. 9 is an exemplary diagram for a screen for setting a standard of a purchasing plate in the BM calculation program of FIG. 7.
Figure 12:
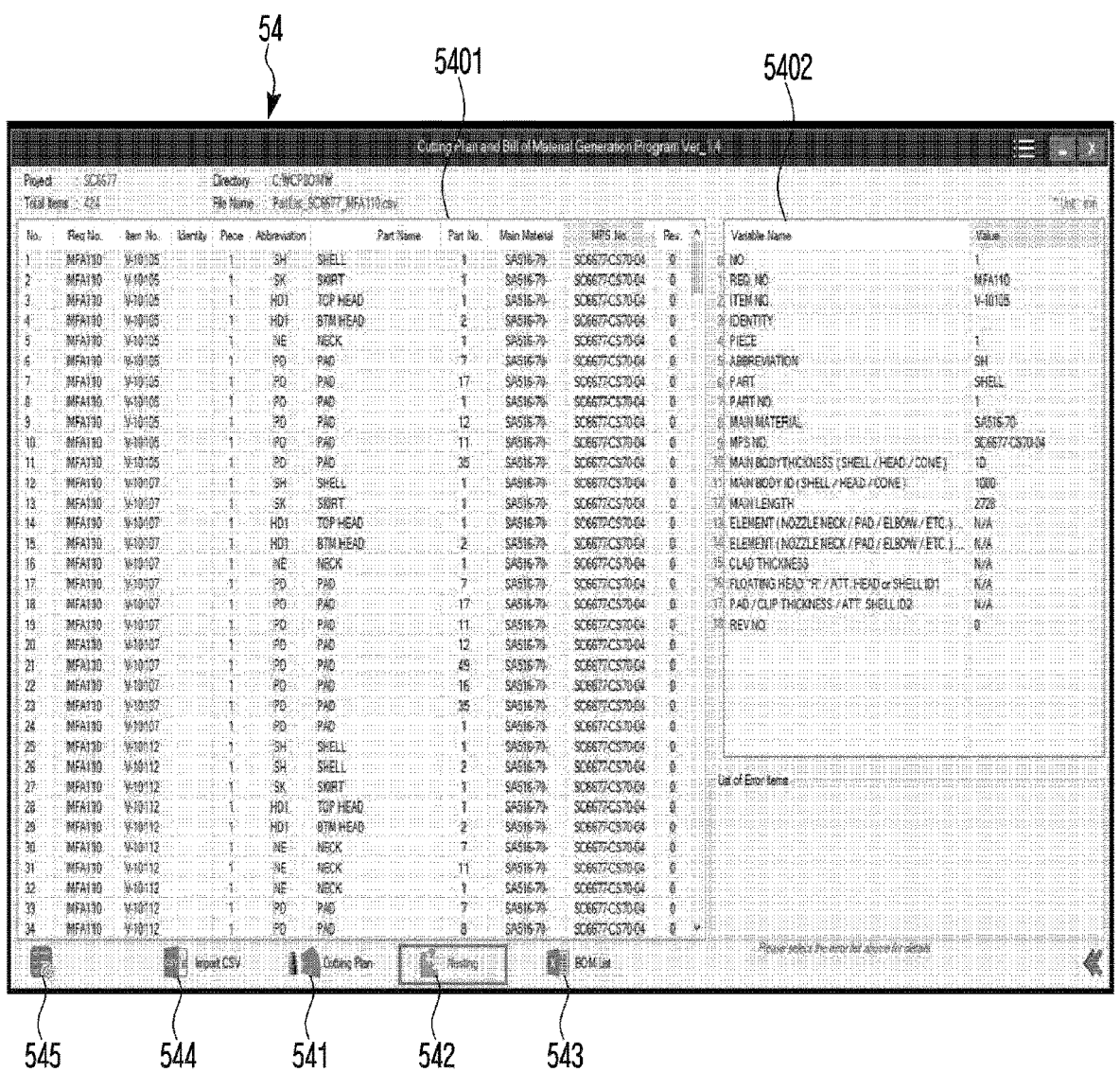
FIG. 12 is a program screen for a step of preparing a nesting plan drawing in the BM calculation program of FIG. 7.

FIG. 1 is a flowchart of a BM automatic calculation method for plant stationary equipment according to the present disclosure, FIGS. 2 and 3 are exemplary diagrams for a second format form in the BM automatic calculation method for plant stationary equipment according to the present disclosure, FIG. 4 is a diagram for a program screen for generating an total part list in the BM automatic calculation method for plant stationary equipment according to the present disclosure, FIG. 5 is an exemplary diagram of an MPS number sheet interlocking with a program for the total part list in the BM automatic calculation method for plant stationary equipment according to the present disclosure, FIG. 6 is an exemplary diagram of the total part list expressed by execution of the program of FIG. 5, FIG. 7 is an exemplary diagram for a start screen of a BM calculation program in the BM automatic calculation method for plant stationary equipment according to the present disclosure, FIG. 8 is an exemplary diagram for a screen for setting cutting and fabrication margins for each part in the BM calculation program of FIG. 7, FIG. 9 is an exemplary diagram for a screen for setting a standard of a purchasing plate in the BM calculation program of FIG. 7, FIG. 10 is a program screen for a step of preparing a cutting plan drawing in the BM calculation program of FIG. 7, FIG. 11 is an exemplary diagram of the cutting plan drawing prepared through the BM calculation program of FIG. 10, FIG. 12 is a program screen for a step of preparing a nesting plan drawing in the BM calculation program of FIG. 7, FIG. 13 is an exemplary diagram of the nesting plan drawing prepared through the BM calculation program of FIG. 12, FIG. 14 is a program screen for a step of generating BM-related data in the BM calculation program of FIG. 7, FIG. 15 is an exemplary diagram of a BOM data sheet generated by FIG. 14, and FIG. 16 is an exemplary diagram of a cutting plan part list data sheet generated by FIG. 14.

FIG. 1 is a flowchart of a BM automatic calculation method for plant stationary equipment according to the present disclosure. The BM automatic calculation method for plant stationary equipment according to the present disclosure is implemented by a computer, and the implemented computer is not limited to a specific computer and is enough to have a memory capable of driving the program. As illustrated in FIG. 1, the BM automatic calculation method for plant stationary equipment according to the present disclosure includes (a) performing strength calculation for each item of a stationary machine having each unique number based on process data required in a plant using a strength calculation program and extracting input data in a first format from a strength calculation result for each item in which the strength calculation is performed (S1), (b) extracting all object data for each item for preparing drawings from the extracted input data in the first format and converting all of the extracted object data into a second format (S2), (c) extracting only information on a part where an item-specific plate is used from all of the object data for each item converted into the second format and generating total part list data interlocking with an MPS number sheet in information data for the extracted part where the item-specific plate is used (S3), (d) loading the total part list data as input data in a BM calculation program (S4), (e) setting the standard of a purchasing plate built with a library within the BM calculation program (S5), (f) setting cutting and fabrication margins for each part for preparing cutting plan drawings built with the library within the BM calculation program (S6), and (g) calculating BM related data by executing the BM calculation program (S7). Hereinafter, a process for each step will be described in detail.

The stationary equipment to which the present disclosure is applied includes a pressure vessel or drum in which a process fluid is temporarily stored, a column or tower in which the process fluid is separated for each component, a heat exchanger for heat-exchanging the process fluid, a reactor in which the process fluids chemically react with each other, and the like.

First, the method is subjected to the step (S1) of performing strength calculation for each item of a stationary machine having each unique number based on process data required in a plant using a strength calculation program and extracting input data of a first format from a strength calculation result for each item in which the strength calculation is performed. Generally, the stationary machine is given with a unique number for the stationary machine every project, which is defined as an item number of the stationary machine. The strength calculation program generally uses a compress program. The process data required for the process of the plant is input using the strength calculation program, the compress program performs the strength calculation according to the input data, and a compress file is generated as the performing result of the strength calculation. The compress file includes various data according to the strength calculation, and the input data in a first format form required in the present disclosure is extracted from the compress file of the strength calculation. The extracted first format data is extracted in a general extensible markup language (XML) file form.

Next, the method is subjected to the step (S2) of extracting all object data for each item for preparing drawings from the extracted input data in the first format and converting all of the extracted object data into a second format. All the object data for each item for preparing the drawings is extracted from the XML file in the first format form. All of the object data for each item include nozzle data, design data, material specification data, and detail drawing data. The nozzle data is data that describes information about a nozzle mounted on each item, the design data is data in which data such as pressure and the like for design for each item is described, the data specification data is data that describes an applicable material used for each item, and the detailed drawing data is drawing data for dimensions and the like of each item. Examples of data for each drawing are omitted. When the object data is extracted, the extracted object data is converted into a second format form, and the second format form is a sheet type comma-separated values (CSV) file form. The CSV file has a format in the form of a data sheet, such as an Excel file, which is a data sheet program. Therefore, the conversion into Excel from the CSV file may be easily performed. Since the CSV file is a data sheet file type, if the second format data may be formatted to a data sheet type file from the first format data instead of the CSV file, the present disclosure may be applied. Therefore, the second format form described in the present disclosure is described in the form of the CSV file, but is not limited thereto.

Next, the method is subjected to the step (S3) of extracting only information on a part where an item-specific plate is used from all of the object data for each item converted into the second format and generating total part list data interlocking with an MPS number sheet in information data for the extracted part where the item-specific plate is used. First, only information about the part where the item-specific plate is used is extracted from all of the object data for each item converted into the second format. Only the information of the part where the item-specific plate is used needs to be extracted from the CSV file. FIGS. 2 and 3 illustrate examples of the CSV file. FIG. 2 illustrates extracting information about a shell, a head, a cone, a nozzle neck, a reinforced pad, a wear plate, and a stiffener ring, which are parts where the item-specific plate is used, from the CSV film including all of the object data. FIG. 2 illustrates extracting information of the part where the item-specific plate is used with respect to shell CSV data 10, and FIG. 3 illustrates extracting information of the part where the item-specific plate is used with respect to heard CSV data 10'. FIGS. 2 and 3 express extracting only plate-related information in the part where the item-specific plate is used, wherein the extraction information is name information 11 and 11' of each part, type information 14 of each part, size information 12 and 12' of each part, and material information 13 and 13' of each part. Only the plate-related information is extracted and used as data that calculates BM later. FIG. 4 illustrates a program screen 20 for loading all object data in all CSV file forms and generating a total part list for calculating BM from all of the loaded object data. As illustrated in the drawing, first, the CSV file with all the object data is loaded, and then an Import CSV button 22 is clicked to load the CSV file. When the CSV file including all the object data is loaded, next, a Convert to Part List button 23 is clicked to extract only information for the part where the item-specific plate is used to extract only specific-part plate-related information. Next, an Import MPS No. button 24 is clicked to call MPS number related information from MPS No. SHEET. The MPS number related information is described in FIG. 5. The MPS No. SHEET 30 includes a plurality of information in a data sheet 31. In detail, as illustrated in the drawing, the MPS No. SHEET 30 includes information about a project number, a Requisition No., a Requisition Name, a unit, an Item No., description, main material, MPS grouping, and the like. When the Import MPS No. button 24 is clicked, only some information from the MPS No. SHEET is included in the part list data screen 21 of FIG. 4. As the data included in the part list data screen 21 of FIG. 4, a project number 32, data information 33 about a Requisition No., a Requisition Name, a unit, and an Item No., data information 34 on a material, and data information 35 about the MPS number are included in the part list. FIG. 4 illustrates only some information, and REQ NO., ITEM NO., PIECE, MAIN MATERIAL, and MPS NO. are displayed on the part list screen 21. To interlock the MPS No. SHEET 30, an item number displayed on an item number display window 29 which is a unique number of the stationary machine displayed on the screen matches the MPS No. SHEET 30 to interlock data. On the entire screen 20 of the part list extraction and conversion program of FIG. 4, the requisition No., the item No., the main material, and the MPS number are interlocked and expressed together. Next, an Export Part List button 27 is clicked to generate a total part list 40. The total part list 40 is generated based on the project number input to a project number input window 25 and the requisition No. input to a requisition No. input window 26. A "clear" and "clear all" button 28 of the entire screen 20 of the part list extraction and conversion program has a function of deleting some data. FIG. 6 illustrates a data sheet 41 of the total part list 40. In the total part list 40, data of the requisition No. (REQ. NO.), the item No. (ITEM NO.), the MPS number, and the main dimensions are illustrated. Specifically, the total part list data 40 is generated in a part list form of size information, material information, shape information, MPS No. information, and information on other related dimensions of the part where the item-specific plate is applied. The total part list data 40 also has a CSV file form.

Next, the method is subjected to the step (S4) of loading the total part list data 40 as input data in the BM calculation program. FIG. 7 illustrates a start screen 51 of a BM calculation program 50. On the start screen 51, a bill of material automatic system (BOMAS) as a program name is displayed, and at the lower end, an option setting button 52 and an Import CSV button 53 for inputting the CSV file are provided sequentially from the left side. When the option setting button 52 is clicked, a screen 520 capable of selecting an option is popped up, and on the popped-up option setting screen 520, a margin option button 521 for settings of the cutting and fabrication margins for each part and a sheet option button 522 for setting the standard of the purchasing plate are displayed. The Import CSV button 53 is a button for inputting the total part list data 40 as the input data. Accordingly, when the Import CSV button 53 is clicked, the total part list data 40 in the CSV file form is loaded and used as the input data.

Next, the method is subjected to the step (S5) of setting the standard of the purchasing plate built with a library within the BM calculation program and the step (S6) of setting cutting and fabrication margins for each part for preparing cutting plan drawings built with the library within the BM calculation program. The order of the two steps may be changed to each other. FIG. 8 illustrates the step (S6) of setting cutting and fabrication margins for each part and FIG. 9 illustrates the step (S5) of setting the standard of the purchasing plate. FIG. 8 illustrates an input screen 5210 of margins displayed when the margin option button 521 is clicked. On the input screen 5210, margins for a consumed amount generated by cutting the plate for fabrication of each part and a consumed amount generated in the fabrication step of welding and attaching the cut plates of predetermined parts to each other. The configuration of the input screen 5210 of the margin option is first provided with a cutting margin input unit 5211 for the consumed amount generated by cutting the plate for each part, fabrication margin input units 5213: 5213a and 5213b for the consumed amount generated in the fabrication process, and a storage unit 5214 for storing a default value formed at the lower end (Restore to Default), saving the input margins, or exiting the screen. The margins are constructed and used in the library within the program. FIG. 9 is an input screen 5220 of a sheet option popped-up when the sheet option button 522 is clicked. On the input screen 5220, a sheet option input unit 5221 and a storage unit 5222 are configured, and the sheet option input unit 5221 may be configured by a sheet option input unit 5221a for a width and a sheet option input unit 5221b for a length. According to each part, the sheet option input unit may be added with various values. The sheet options are also constructed with the library within the program.

Next, the method is subjected to the step (S7) of calculating BM related data by executing the BM calculation program. When the margin options and the sheet options are set, the BM output program is executed. The BM calculation program is configured by (g-1) preparing a cutting plan drawing according to the set cutting and fabrication margins for each part (S7-1), (g-2) preparing a nesting plan drawing optimized by disposing the cutting plan drawing in the standard of the set purchasing plate (S7-2), and (g-3) generating BOM list and cutting plan part list data based on the nesting plan drawing (S7-3). FIGS. 10 to 15 illustrate outputs generated in the step of executing the BM calculation program and a screen of the BM calculation program.

First, the method is subjected to the step (S7-1) of preparing the cutting plan drawing. The cutting plan drawing is a drawing of a state where the margins are input. An execution screen 54 of the BM calculation program is configured by a main screen unit 540 and respective execution buttons. The main screen unit 540 is configured by an entire data screen unit 5401 on which the entire data is displayed, and an individual data screen unit 5402 for data in which a cursor is located. The respective execution buttons are configured by a cutting plan button 541 for preparing the cutting plan drawing, a nesting button 542 for optimizing and disposing the cutting plan drawing, a BOM List button 543 for outputting a BOM list calculated from the entire data, an Import CSV button 544 for inputting the total part list data, and a setting button 545 for screen settings. FIG. 10 illustrates a cutting plan drawing generated when the cutting plan button 541 is clicked. The cutting plan drawing is prepared as a drawing for each part according to a predetermined cutting margin. The cutting plan drawing is a part-specific deployed diagram for fabrication the stationary machine, and is a drawing prepared by cutting a plate according to a cutting plan, and using the cutting plate as it is, or bending and using the cutting plate to a specific shape. FIG. 11 is a cutting plan drawing generated when the cutting plan button 541 is clicked. As illustrated in the drawing, the cutting plan drawings include a drawing 5411a for the shell, a drawing 5411b for the cone, a drawing 5411c for the nozzle, the pad, and the stiffener ring, and a drawing 5411d for the head, and a cutting plan drawing for all stationary machine items having the same requisition No. of the corresponding project is generated.

Next, the method is subjected to the step (S7-2) of preparing a nesting plan drawing optimized by disposing the cutting plan drawing in the standard of the set purchasing plate. FIG. 12 illustrates a step of preparing a nesting plan drawing optimized by disposing the cutting plan drawing in a predetermined standard of plate after preparing the cutting plan drawing on the same BM calculation program. When the nesting button 542 shown in the drawing is clicked, the step in which the prepared cutting plan drawing is optimized and disposed with the same material of plate is subjected. The optimized disposition is performed while in the cutting plan drawing of the part having the matched MPS No., and the same material and thickness of the plate, the largest part is disposed according to a width on the purchasing standard upward from the left lower end and the cutting plan drawing for each part sequentially from the left side to the right side in a longitudinal direction is disposed in an empty space. FIG. 13 illustrates that the nesting plan drawing 5421 in which the optimized disposition of the cutting plan drawing for each part is performed is generated when the nesting button 542 is clicked. In the optimized nesting plan drawing 5421, a part-specific cutting plan drawing having the same MPS number, the same thickness, and the same material is disposed. Specifically, in the nesting plan drawing 5421, a project number, a requisition number, and an MPS No. are disclosed, a material and the size of the purchasing plate are disclosed, and the quantity and the weight are illustrated. In one nesting plan drawing, since each part used in the same plate is illustrated, it is obvious that the part having the same MPS No., the same thickness, and the same material is disclosed. In addition, abbreviation is displayed in the bottom. In a standardized plate drawing 5421-1, cutting plan drawings of a plurality of parts are illustrated, and in the bottom of the drawing 5421-1, matters 5421-2 for items used in the plurality of cutting plan drawings on the plate drawing are disclosed.

Next, the BM calculation method is terminated through the step (S7-3) of generating the BOM list and the cutting plan part list data based on the nesting plan drawing. Specifically, according to the nesting plan drawing in which the cutting plan drawing is optimized and disposed, a BOM list 5431 of FIG. 14 and a cutting plan part list 5432 of FIG. 15 are generated. It will be described in detail. When a BOM List button 543 of FIG. 13 is clicked, the BOM list and the cutting plan part list are generated, and in the BOM List, information about a BM number, a material, MPS No., and the standard (thickness, width, length, quantity, weight, plate usage degree, etc.) of the plate and an item applicable part where the corresponding plate is used are displayed. The BM number is written from SC6677-MFA110-BM-001, and the number is sequentially numbered along the leftmost number (No.). As described above, since the quantity of the accurate plate is displayed in the BOM list, the total purchase amount may be determined. Further, the cutting plan part list 5432 is data that describes a part used for the corresponding BM number. The left BM NO. is matched with the BOM list to specify the used item.

As described above, the BM automatic calculation method of the plant stationary equipment according to the present disclosure primarily performs processes of generating XML data from a strength calculation program, generating CSV type data by extracting object data from the XML data, and generating a total part list by extracting a part where a plate is used from all the object data. Next, the BM automatic calculation method secondarily performs a BM calculation program execution step of executing a program by receiving the total part list as input data. The primary process is performed in a general Window system and the secondary process is performed on AUTOCAD as a drawing preparation universal program. The BM calculation program required for the secondary process is a program using OpenDCL and Visual LISP programs of the AUTOCAD, and is executed on the AUTOCAD after the AUTOCAD is first executed.

Since the BM automatic calculation method of the plant stationary equipment according to the present disclosure can accurately calculate the quantity of plates for each part used for the stationary machine using the strength calculation result, it is possible to accurately determine costs required for fabricating the stationary equipment of the plant, and as a result, the cost reduction may be effective. In addition, since the BM calculation, which has been manually performed in the related art, may be easily performed by the program, the workforce reduction may be effective. Further, since the cutting plan may be accurately performed, there is an advantage of minimizing the scrap amount of the required plates.

As described above, the present disclosure can be made in various modifications, and preferred embodiments of the present disclosure have been described, but the present disclosure is not limited to these embodiments. In the claims and the detailed description of the present disclosure, it will be appreciated that the techniques that can be modified and used by those skilled in the art are included in the scope of the present disclosure.

What is claimed is:

1. A BM (Bill of Material) automatic calculation method of plant stationary equipment implemented by a computer, comprising the steps of:
   (a) performing strength calculation for each item of a stationary machine having each unique number based on process data required in a plant using a strength calculation program and extracting input data in a first format from a strength calculation result for each item in which the strength calculation is performed;

(b) extracting all object data for each item, including nozzle data, design data, material specification data, and detail drawing data for preparing drawings from the extracted input data in the first format and converting all of the extracted object data into a second format;

(c) extracting only information on a part where an item-specific plate is used from all of the object data for each item converted into the second format and generating total part list data interlocking with an MPS (material purchaser specification) number sheet in information data for an extracted part where the item-specific plate is used;

(d) loading the total part list data as input data in a BM calculation program;

(e) setting a standard of a purchasing plate built with a library within the BM calculation program;

(f) setting cutting and fabrication margins for each part for preparing cutting plan drawings built with the library within the BM calculation program; and (g-1) preparing a cutting plan drawing according to the set cutting and fabrication margins for each part;

(g-2) preparing a nesting plan drawing optimized by disposing the cutting plan drawing in the standard of the set purchasing plate; and (g-3) generating a BM (bill of material) list and a cutting plan part list data that matches a BM number listed in the BM list, based on the nesting plan drawing.

2. The BM automatic calculation method of plant stationary equipment of claim 1, wherein in step (a), the first format is formatted in an XML (extensible markup language) file form.

3. The BM automatic calculation method of plant stationary equipment of claim 1, wherein in step (b), the second format is formatted in a data sheet file form.

4. The BM automatic calculation method of plant stationary equipment of claim 1, wherein in step (c), the part where the item-specific plate is used includes a shell, a head, a cone, a nozzle neck, a reinforced pad, a wear plate, and a stiffener ring, which are parts included in the object data for each item converted into the second format.

5. The BM automatic calculation method of plant stationary equipment of claim 4, wherein information about parts including the shell, the head, the cone, the nozzle neck, the reinforced pad, the wear plate and the stiffener ring is name information of each part, type information of each part, size information of each part, and material information of each part.

6. The BM automatic calculation method of plant stationary equipment of claim 1, wherein the material purchaser specification (MPS) number sheet of step (c) is mutually mapped based on an item number of the stationary machine and interlocks with the information data for the extracted part where the item-specific plate is used.

7. The BM automatic calculation method of plant stationary equipment of claim 6, wherein items to be added to the total part list data by the interlocking of the MPS number sheet are a project number, a requisition number, and an MPS number.

8. The BM automatic calculation method of plant stationary equipment of claim 1, wherein the total part list data of step (c) includes data for size information, material information, shape information, MPS number information, and dimension information on an item-specific plate application part.

9. The BM automatic calculation method of plant stationary equipment of claim 1, wherein the setting of the standard of the purchasing plate in step (e) is to set minimum and maximum sizes of a width and a length of a purchasable plate as a set default range in the library and set the standard of the purchasing plate within the set default range.

10. The BM automatic calculation method of plant stationary equipment of claim 1, wherein the setting of the cutting and fabrication margins for each part in step (f) is to set the cutting and fabrication margins in consideration of a consumed amount during cutting and a consumed amount during fabrication.

11. The BM automatic calculation method of plant stationary equipment of claim 1, wherein in step (g-2), a part-specific cutting plan drawing having a same MPS number, a same thickness, and a same material is disposed in the optimized nesting plan drawing.

12. The BM automatic calculation method of plant stationary equipment of claim 1, wherein the BM calculation program in steps (d) to (g) is executed on an AUTOCAD as a universal drawing preparation program.

* * * * *